United States Patent [19]
Höll

[11] Patent Number: 5,403,044
[45] Date of Patent: Apr. 4, 1995

[54] APPARATUS FOR THE ARTICULATED CONNECTION OF PIPES OF AN EXHAUST SYSTEM

[75] Inventor: Alfred Höll, Rheinstetten, Germany

[73] Assignee: IWK Regler und Kompensatoren GmbH, Rheinstetten, Germany

[21] Appl. No.: 187,713

[22] Filed: Jan. 28, 1994

[30] Foreign Application Priority Data

Feb. 6, 1993 [DE] Germany .................. 43 03 482.9

[51] Int. Cl.$^6$ ............................................. F16L 13/04
[52] U.S. Cl. .................................. 285/114; 285/226; 285/286
[58] Field of Search ............... 285/301, 114, 226, 269

[56] References Cited

U.S. PATENT DOCUMENTS

| 1,191,486 | 7/1916 | Tyler | 285/226 X |
| 2,865,403 | 12/1958 | Le Vantine | 285/226 X |
| 3,768,843 | 10/1973 | Burtis | 285/301 X |
| 4,643,463 | 2/1987 | Halling et al. | 285/226 |
| 4,791,963 | 12/1988 | Gronert et al. | 285/226 X |
| 5,090,746 | 2/1992 | Holzhausen | 285/226 |
| 5,299,837 | 4/1994 | Lagier | 285/226 X |

FOREIGN PATENT DOCUMENTS 708598 7/1931 France ........................... 285/226

Primary Examiner—Dave W. Arola
Attorney, Agent, or Firm—Antonelli, Terry, Stout & Kraus

[57] ABSTRACT

The invention proposes a simple and inexpensive apparatus for the articulated connection of pipes of an exhaust system, such as of a motor vehicle, which has pipe sections connected by a flexible line part, such as a bellows, in which resilient elements engaging round the line part are provided having casing parts axially interengaging with projections and in each case connected to a pipe section and with at least one ring part, coaxial to the bellows, connecting both casing parts over their circumference in the vicinity of their projections.

27 Claims, 3 Drawing Sheets

APPARATUS FOR THE ARTICULATED CONNECTION OF PIPES OF AN EXHAUST SYSTEM

FIELD OF THE INVENTION

The invention relates to an apparatus for the articulated connection of pipes of an exhaust system, such as that of a motor vehicle, with pipe sections connected by a flexible line part such as a bellows.

BACKGROUND OF THE INVENTION

Numerous different constructions of articulated connections of exhaust systems such as for motor vehicles are known. However, in each case there are damping cushions pressed from wire which are placed in casing pockets. The known apparatuses are complicated and therefore expensive and also lead to a considerable weight. If circular damping cushions placed round the bellows are also provided, the above remarks also apply with respect thereto. In addition, as they are freely placed in their circular casing pockets, they are unable to absorb torsional forces between the pipe sections and are instead freely movable, so that the torsional forces are transferred in unhindered manner to the bellows and can easily damage the latter. To the extent that torsional forces are absorbed in different construction forms, particularly with individual cushions distributed over the circumference, it is necessary to provide for the wire cushions abutments absorbing torsional movements in the circumferential direction and the abutments represent an additional cost factor.

SUMMARY OF THE INVENTION

The aim of the invention is to provide an apparatus of the aforementioned type, which has an extremely simple construction and is therefore inexpensive, a low weight, but is still able to reliably absorb all the movements and forces which occur.

According to the invention, an apparatus of the aforementioned type includes resilient elements engaging around the line part having casing parts axially engaging with projections and in each case connected to a pipe section and with at least one ring part, coaxial to the bellows, connecting over their circumference the two casing parts in the vicinity of their projections.

The projections engage axially in one another or a recess left between two projections of a casing part engages in a projection of the other casing part. The projections all have the same radial spacing from the bellows and consequently interengage in a common circumferential surface.

The resilience or stiffness of the ring part on the one hand and the projections of the casing parts on the other can be selected in different, but matched ways. Thus, the ring part can be constructed as a damping part, i.e. has a reduced stiffness. It can optionally also be slightly flexible. However, it is additionally possible to make the projections of the casing parts to a certain extent resilient and optionally damped and springy, so that during operation of the exhaust system both can absorb forces.

In such constructions the ring part is preferably constructed as a cable or as a flat band braided from wire. According to preferred developments of the ring part, the latter is constructed as a closed helical spring placed around the casing parts and whose turns have a constant diameter, or as a spring ring or washer, optionally with a sinusoidal guide. A line interconnecting the centres of the individual turns of the helical spring consequently surrounds the bellows in a coaxial manner.

If the casing parts and in particular their projections are constructed flexibly, then the ring part can be completely rigid, such as a rigid metal ring.

Whereas the ring part is preferably a continuous ring part or optionally a continuous band, according to an alternative construction the free ends of the wire or band-like element forming the ring part can be connected by means of a lock.

Whereas the projections of the casing parts in a highly preferred embodiment have a sinusoidal construction and engage in one another, in radial projection they can also be rectangular and coaxially surround the bellows.

The circumferential spacing between the projections of the casing parts should be between 5° and 20° and in particularly preferred manner a relative rotary movement of the casing parts of ±5° is allowed.

The ring part can be fixed in numerous different ways to the projections of the casing parts. It is firstly fixed in the axial direction, preferably being braced round the projections of the casing parts, so that axial, angular and displacement forces are absorbed. If the ring part is also locally held on the projections of the casing parts, it is also possible to absorb rotary movements.

In a particularly preferred manner the ring part is secured against axial sliding on the projections and/or the ring part is secured on the projections against a relative, angular shift with respect to the same (against rotation).

According to preferred developments the ring part is inserted in grooves or groove portions formed in the projections of the casing parts. Clips fixed to the projections of the casing parts locally engage over the ring part and/or the ring part is connected to the projections of the casing parts by spot welding.

In another development, the groove can be replaced by the casing parts axially interengaging with sinusoidally constructed projections.

Alternatively or in addition to grooves or slits, according to another preferred development, tongues punched from the projections of the casing parts project over the ring part and secure the same.

Whereas in the above-described constructions the ring part is in principle placed round the casing parts, i.e. is positioned on the outside thereof, according to a particularly preferred development, the ring part is positioned within the projections of the casing parts and the free ends of the projections engage below it from the inside and retain the same, Another construction is characterized in that the ring part is inserted and retained in U-profile parts placed and fixed on the projections of the casing parts and optionally the free ends of the legs of the U-parts are bent against one another.

The invention leads to a simple, lightweight, inexpensive apparatus, in which an adaptation to the forces to be absorbed can be brought about via the stiffness of the casing parts or the ring part.

BRIEF DESCRIPTION OF THE DRAWINGS

Further advantages and features of the invention can be gathered from the claims and the following description of embodiments of the invention with reference to the attached drawings, wherein

DETAILED DESCRIPTION

Figure 1:
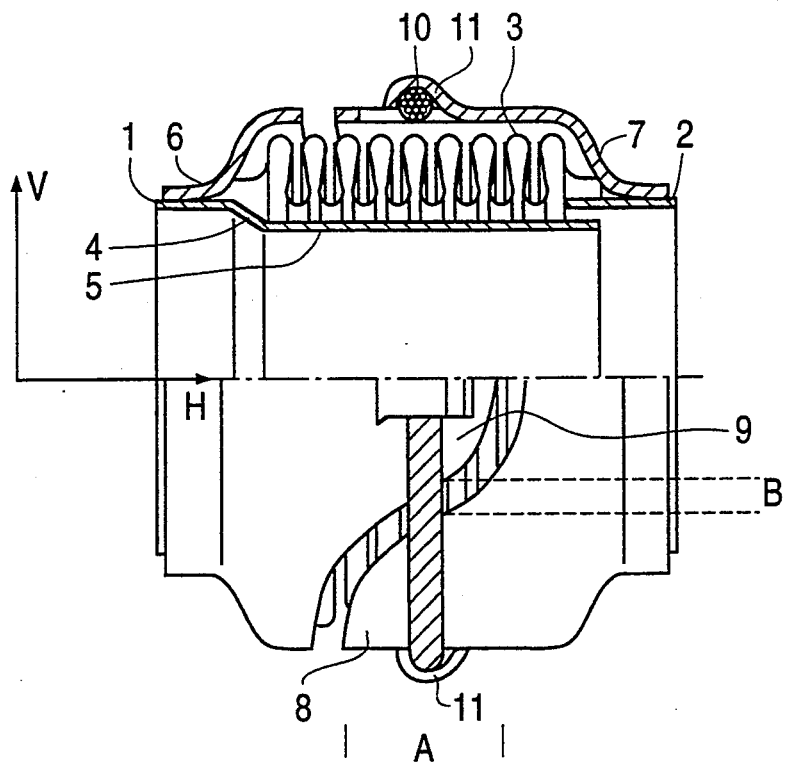
FIG. 1 is a schematic partial cross-sectional view of a first embodiment of the apparatus according to the invention with a cable applied to the casing halves and over which tongues locally pass.

The apparatus according to the invention for the articulated connection of the pipes of an exhaust system has pipe sections 1,2, which are connected flexibly and in articulated manner with one another by a bellows 3. The pipe section 1 includes a tapered portion 4 and projects with a shoulder 5 into the interior of the bellows 3 into the vicinity of the pipe section 2. Casing parts 6,7 are externally mounted on the pipe sections 1,2 and axially interengage via an area A (FIG. 1). The interengaging projections 8,9 circumferentially having a spacing B, which allows a relative rotation of the casing parts 6,7 by 5° to 20° and, in the illustrated embodiment the relative rotation is ±5°.

In the overlap area A the two casing parts 6,7 are surrounded by a ring part in the form of a cable 10 which engages around them. The cable is firstly axially held by tongues 11 punched from the projections 8,9 of the casing half. The tongues 11 can also secure the portions of the cable 10 which they embrace in the angular direction, i.e. positively, against the torsional moments which occur.

By the damping-flexible cable 10 translatory movements in all directions, i.e. axial, angular and displacement movements of the two pipe sections 1,2 are elastically absorbed in damping manner, so that they do not fully act on the bellows 3. The same applies with regards to rotary movements, provided that the cable 10 is positively secured by the tongues 11.

Movements or forces initiated from a pipe section must initially overcome the stiffness of the cable 10, before they can be transferred to the other casing half and therefore to the other pipe section. The casing halves are so uncoupled from one another, that initiated stresses are reduced in the exhaust system by means of the apparatus according to the invention. Vibrations are also reduced. In accordance with the cable stiffness, small movements only give rise to small forces, which cause only minor movements to be transferred.

Figure 2:
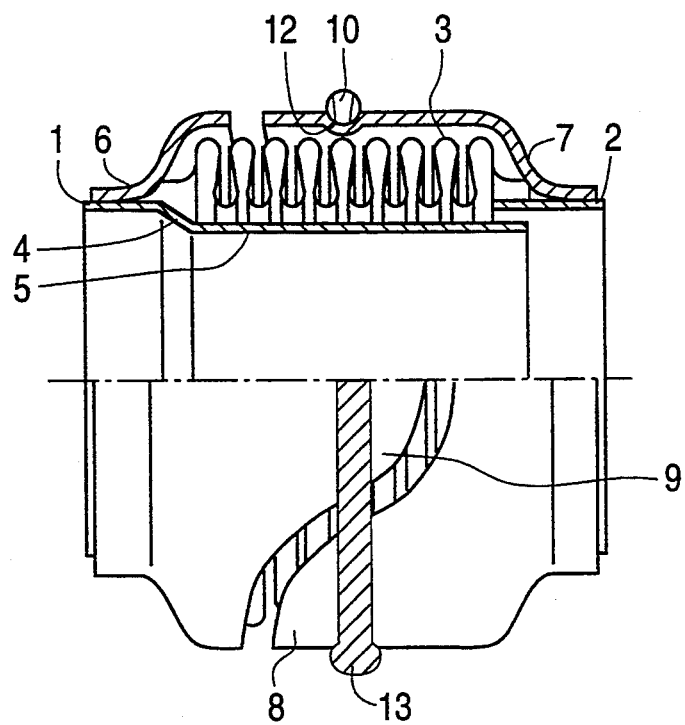
FIG. 2 is a schematic partial cross-sectional view of another embodiment of the apparatus according to the invention with the cable placed in grooves formed in the casing halves.

In the construction according to FIG. 2 in the axially overlapping or interengaging projections 8,9 of the casing parts 6,7 grooves or groove portions 12 are made in their circumferential direction. In addition, the cable 10 can engage over by clips fixed to the projections 8,9 of the casing halves or can be locally spot welded to the projections 8,9, so as to be able to absorb rotary forces (FIG. 2).

Figure 3:
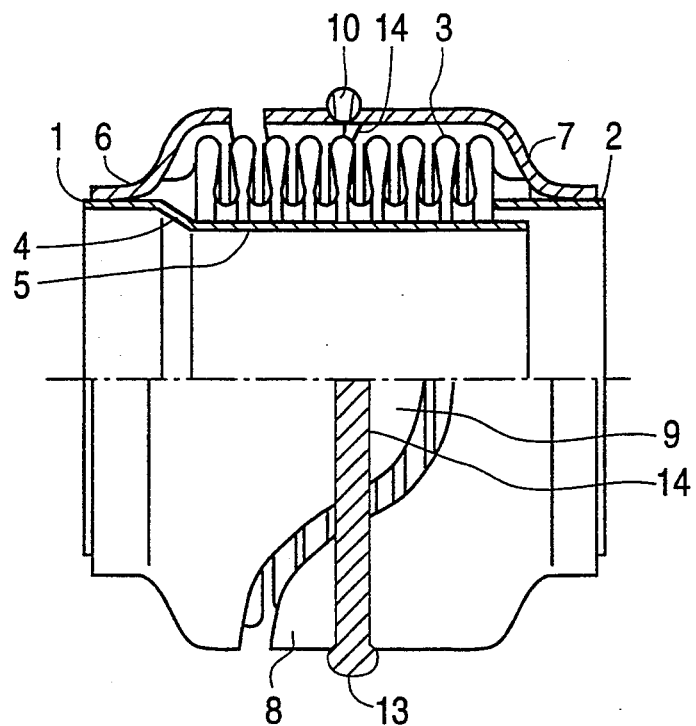
FIG. 3 is a schematic partial cross-sectional view of another embodiment of the apparatus according to the invention with a cable held radially in cutouts in the casing halves.

In the construction of FIG. 3 individual slits 14 are formed in the projections 8,9 and the cable 10 is locally inserted and fixed therein. Once again clips 13 or spot-welds can be provided, as described hereinbefore (FIG. 3). The free ends of the cable 10 can be interconnected by a cable fastener.

Figure 4:
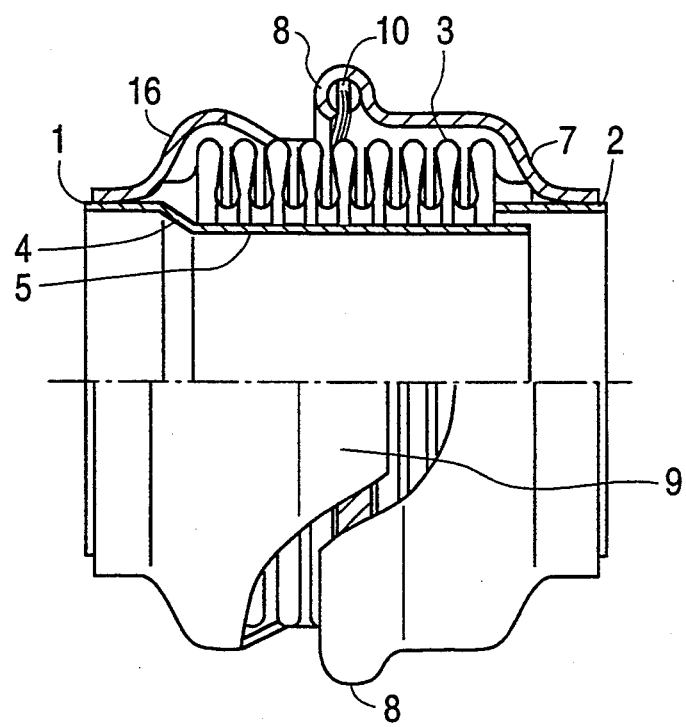
FIG. 4 is a schematic partial cross-sectional view of a further embodiment of the present invention wherein a cable is placed within the casing halves which tongues engaging there around for radially securing the casing halves.

In the construction of FIG. 4, the cable 10 is located within the casing parts 6,7. In order that it can exert its spring and damping actions, the outermost ends of the projections 8,9 of the casing parts 7 are bent around and below the cable 10, so that they engage below and therefore support the latter from the interior of the casing halves 6,7. If it is intended that rotary forces are to be absorbed, the bent round areas of the projections 8,9 can be locally pressed into the cable or the latter can be locally spot welded to the projections 8,9.

Figure 5:
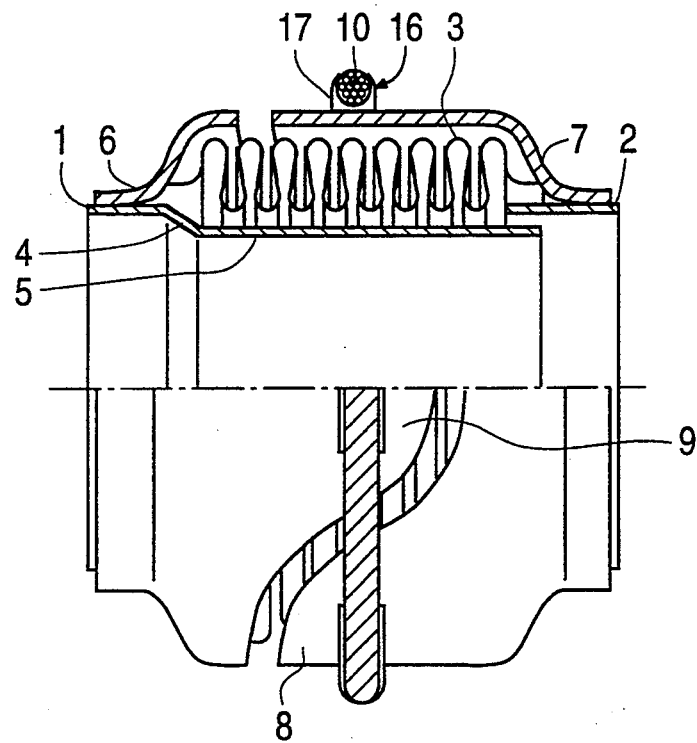
FIG. 5 is a partial cross-sectional view of U-shaped profiles mounted in the casing halves having free legs placed around the cable inserted therein.

In the construction of FIG. 5 cross-sectional U-shaped profile parts 16 are fixed on the projections 8,9 of the casing halves 6,7, e.g. by welding. In the profile parts 16 is placed the cable 10, so that it is axially held by the profile parts 10. The ends 17 of the free legs of the profile parts 16 are bent against one another, so that they grasp the cable 10.

Figure 6:
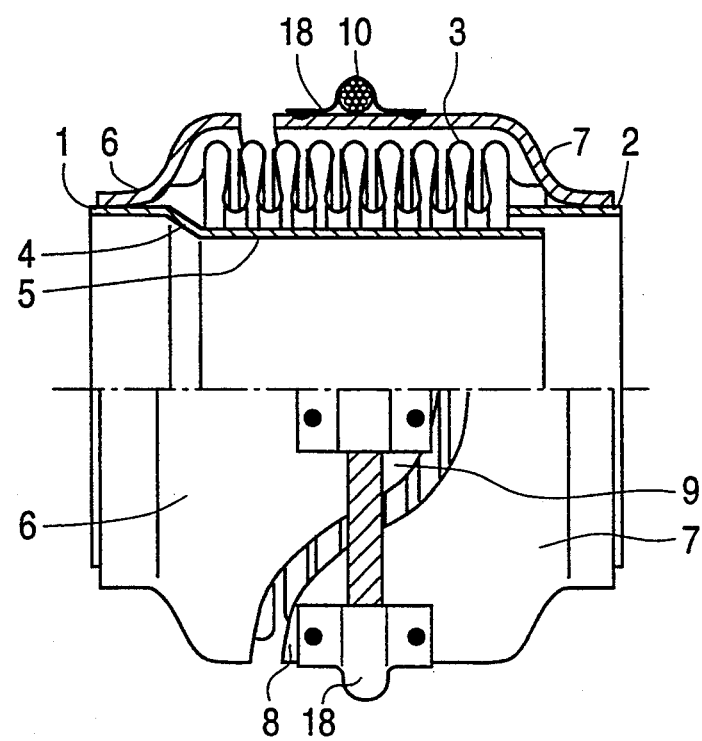
FIG. 6 is a partial cross-sectional view of a still further embodiment of the apparatus according to the present invention with fitted holding tongues securing the cable against torsional moments.

FIG. 6 shows a construction of the apparatus according to the invention, in which the cable 10 is secured against torsional moments by tongues 18 riveted to the casing halves 6,7 in the vicinity of the projections 8,9.

While the invention has been described hereinbefore by means of a damped-flexible cable, it is also possible to provide other damped, flexible, circular or annular elements and can be placed around the casing parts 6,7, particularly in the vicinity of their axially interengaging projections 8,9, e.g. flat, braided wire bands, spring rings, which are e.g. also sinusoidally guided, helical spiral springs, etc. In this case the casing halves 6,7 and in particular their projections 8,9 are preferably rigid and consequently have an extremely high stiffness. It is also possible to provide damped-flexible characteristics, i.e. a reduced stiffness, on the casing halves 6,7 or in particular their projections 8,9. If this is the case, the part engaging around the same can also be a rigid ring, so that vibrational movements are absorbed and transmitted, in that e.g. in the case of an angular movement the free ends 8,9 bend elastically, as a function of the plane in which the movement takes place.

While once again the circular elements engaging round the projections 8,9 of the casing parts 6,7 can be continuous elements, such as continuous rings, it is also possible to provide them with ends connected by locks.

I claim:

1. Apparatus for an articulated connection of pipes of an exhaust system including pipe sections connected by a flexible line pipe, the apparatus comprising flexible elements positioned around the flexible line pipe part, said flexible elements having axially interengaging casing parts including projections, said casing parts being connected to the respective pipe sections, and at least one ring part means, coaxially disposed with respect to the flexible line pipe, for connecting to and said casing parts about a circumferential area of said projections.

2. Apparatus according to claim 1, wherein the at least one ring part means is resiliently flexible.

3. Apparatus according to claim 2, wherein the at least one ring part means is constructed as a cable.

4. Apparatus according to claim 2, wherein the at least one ring part means is constructed as a braided flat band from wire.

5. Apparatus according to claim 2, wherein the at least one ring part means is constructed as a closed helical spring placed around the casing parts, and wherein turns of the closed helical spring have a constant diameter.

6. Apparatus according to claim 2, wherein the at least one ring part means is constructed as a spring ring.

7. Apparatus according to claim 6, wherein the at least one ring part means is sinusoidal.

8. Apparatus according to one of claims 1 or 2, wherein the projections of the casing part are resilient.

9. Apparatus according to claim 8, wherein the at least one ring part means is rigid.

10. Apparatus according to claim 9, wherein the at least one ring part means is a rigid metal ring.

11. Apparatus according to one of claims 1 or 2, wherein the at least one ring part means is constructed as a continuous ring part.

12. Apparatus according to one of claims 1 or 2, wherein free ends of the at least one ring part means are interconnected by a lock.

13. Apparatus according to one of claims 1 or 2, wherein the projections of the casing parts are sinusoidal projections.

14. Apparatus according to one of claims 1 or 2, wherein the projections of the casing parts are rectangular in a radially projection and coaxially surround the flexible line part pipe.

15. Apparatus according to one of claims 1 or 2, wherein the projections of the casing parts circumferentially have a free spacing of 5° to 20°.

16. Apparatus according to one of claims 1 or 2, wherein the at least one ring part means is secured against axial sliding on the projections.

17. Apparatus according to one of claims 1 or 2, wherein the at least one ring part means is secured on the projections against a relative angular displacement with respect thereto.

18. Apparatus according to one of claims 1 or 2, wherein the at least one ring part means is disposed in at least one circumferentially disposed groove portion formed in the projections.

19. Apparatus according to claim 18, wherein the at least one ring part means is disposed in circumferentially disposed grooves formed in the projections.

20. Apparatus according to one of claims 1 or 2, wherein clips, fixed to the projections, locally engage over the at least one ring part means.

21. Apparatus according to one of claims 1 or 2, wherein the at least one ring part means is connected to the projections by spot welding.

22. Apparatus according to one of claims 1 or 2, wherein tongues, punched from the projections, engage over and fix the at least one ring part means.

23. Apparatus according to one of claims 1 or 2, wherein circumferentially extending slits are formed in the projections.

24. Apparatus according to one of claims 1 or 2, wherein the at least one ring part means is placed within the projections, and wherein free ends of the projections engage below the casing parts from an inside and secure the casing parts.

25. Apparatus according to one of claims 1 or 2, wherein the at least one ring part means is inserted and fixed in U-shaped profile parts mounted and fixed on the projections.

26. Apparatus according to claim 25, wherein free ends of legs of the U-shaped profile parts are bent against one another.

27. Apparatus according to claim 1, wherein the exhaust system is an exhaust system of a motor vehicle.

* * * * *